(12) United States Patent
Carmichael et al.

(10) Patent No.: US 9,648,114 B2
(45) Date of Patent: May 9, 2017

(54) SYSTEM AND METHOD FOR DISPLAYING DATA FEEDS FROM MULTIPLE ONLINE SOCIAL NETWORKS

(71) Applicant: Ubiquity Broadcasting Corporation, Irvine, CA (US)

(72) Inventors: Christopher Carmichael, Irvine, CA (US); Connie Jordan, Laguna Niguel, CA (US); Devon Jordan, Irvine, CA (US); Desoto Donovan, Irvine, CA (US)

(73) Assignee: Ubiquity Broadcasting Corporation, Irvine, CA (US)

( * ) Notice: Subject to any disclaimer, the term of this patent is extended or adjusted under 35 U.S.C. 154(b) by 190 days.

(21) Appl. No.: 14/177,492

(22) Filed: Feb. 11, 2014

(65) Prior Publication Data
US 2014/0250185 A1 Sep. 4, 2014

Related U.S. Application Data

(60) Provisional application No. 61/763,263, filed on Feb. 11, 2013.

(51) Int. Cl.
*G06F 15/16* (2006.01)
*H04L 29/08* (2006.01)
*G06Q 50/00* (2012.01)

(52) U.S. Cl.
CPC .............. *H04L 67/22* (2013.01); *G06Q 50/01* (2013.01)

(58) Field of Classification Search
None
See application file for complete search history.

(56) References Cited

U.S. PATENT DOCUMENTS

| 2011/0137894 | A1* | 6/2011 | Narayanan | G06F 17/3089 707/723 |
| 2012/0117484 | A1* | 5/2012 | Convertino | G06F 17/30864 715/744 |
| 2013/0166580 | A1* | 6/2013 | Maharajh | H04L 65/605 707/758 |

FOREIGN PATENT DOCUMENTS

WO WO2013127673 A1 9/2013

OTHER PUBLICATIONS

Przemyslaw Kazienko, Katarzyna Musial, Elzbieta Kukla, Tomasz Kajdanowicz and Piotr Brodka, "Multidimensional Social Network: Model and Analysis", ICCCI 2011, Part I, LNCS 6922, pp. 378-387, 2011.*

(Continued)

*Primary Examiner* — Umar Cheema
*Assistant Examiner* — John Fan

(57) ABSTRACT

Multiple different social networks are aggregated and placed together on a timeline. The timeline is arranged such that at any given time the user can see what information from each of the social networks was provided. The timeline is arranged in a two-dimensional grid, with the horizontal grid showing time, and the vertical grid showing the type, where the type can be video, text, wall posts, and photos. The user can select which of their friends information to appear on the timeline and can also select which of multiple different social network type sites provide content to the timeline.

16 Claims, 2 Drawing Sheets

(56) References Cited

OTHER PUBLICATIONS

Rongjing Xiang, Jennifer Neville and Monica Rogati, "Modeling Relationship Strength in Online Social Networks", WWW 2010, Apr. 26-30, 2010, Raleigh, North Carolina. ACM 978-1-60558-799-8/10/04.*

Tina McCorkindale, "Can you see the writing on my wall? A content analysis of the Forturne 50's Facebook social networking sites", Public Relations Journal vol. 4, No. 3, Summer 2010.*

* cited by examiner

SYSTEM AND METHOD FOR DISPLAYING DATA FEEDS FROM MULTIPLE ONLINE SOCIAL NETWORKS

This application claims priority from provisional application number 61763263, filed 11 Feb. 2013, the entire contents of which are herewith incorporated by reference.

BACKGROUND

Online social networking sites have been rapidly gaining in popularity. Often, users are members of various social networking sites simultaneously, and often maintain an overlapping network of "friends" or interlinked members on each of those social network sites.

In addition, users will often post to one social network site. Consequently different information about the user's friends may be obtained when accessing different social network sites.

SUMMARY

Keeping up with all the online social networking sites has become increasingly cumbersome and time consuming.

Users maintain log in information for each individual online social networking site, which can be time consuming.

Also, in order to see a data stream from each of their social networks, the user needs to "log in" to the respective sites which again can prove cumbersome.

In addition, some of the data presented on each of the social networking sites may overlap and create unnecessary information overflow.

The present application describes a system and method for data aggregation across multiple online social networks, and more specifically, to a system and method for displaying data from multiple social network sites in a graphical interface.

DETAILED DESCRIPTION

Figure 1:
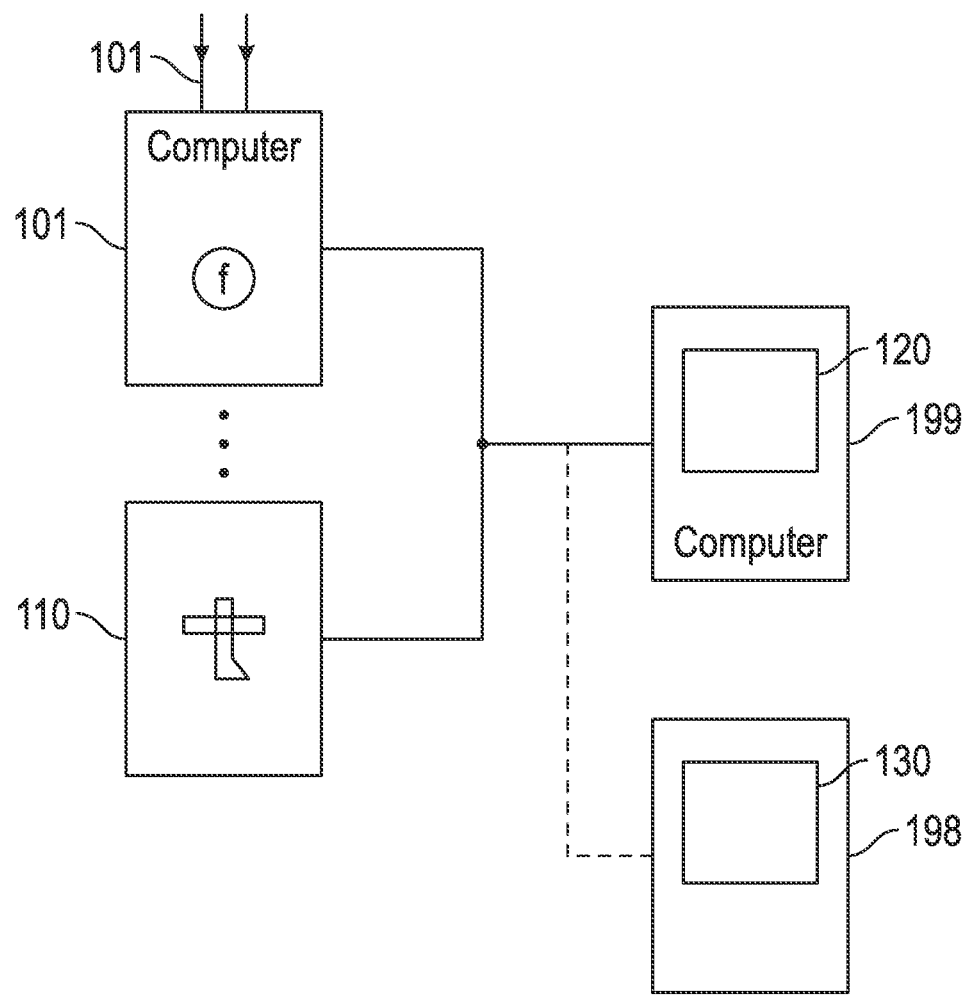
FIG. 1 shows a block diagram of a computer system.
Figure 2:
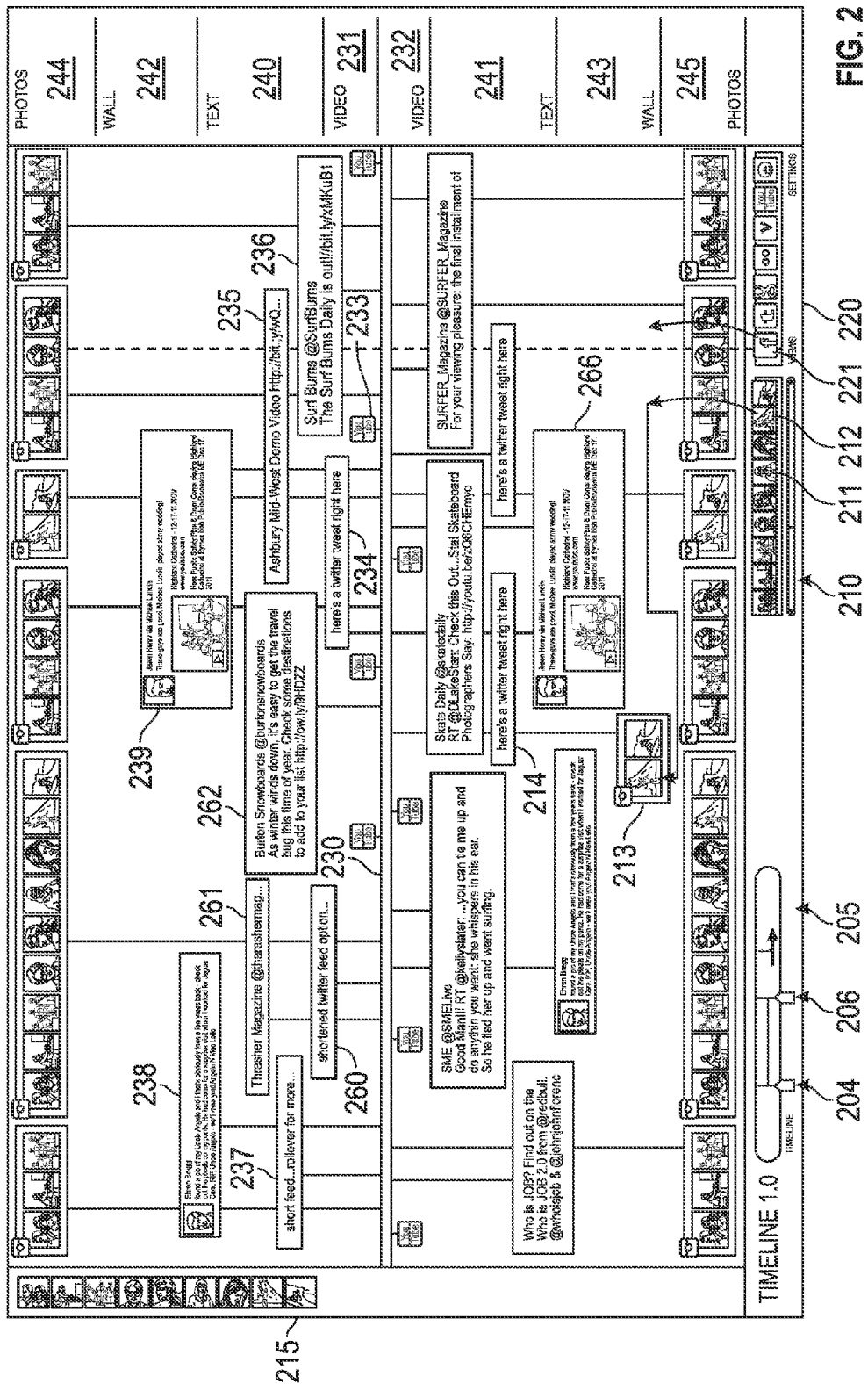
FIG. 2 shows a timeline view which combines together multiple different social networking sites and information from the social networking sites.

Embodiments address improving the current system of multiple online social networking data feeds by allowing users to track data feeds from these sites from a singular site. The improvement is achieved by providing a graphical interface that represents the data both chronologically and geographically.

A social networking service is a platform to build social networks or social relations among people who, for example, share interests, activities, backgrounds, or real-life connections. A social network service can include one or more of the following features. A representation of each user (which can be in one embodiment a profile) is provided with the user's social links, and a variety of additional services. Most social network services are web-based and provide interaction over the Internet, such as e-mail and instant messaging. Online community services are sometimes considered as a social network service, although in a broader sense, social network service usually means an individual-centered service whereas online community services are group-centered. Social networking sites allow users to share different kinds of information, e.g., ideas, pictures, posts, activities, events, and interests with people in their network.

Specifically, the graphical interface provides a user with an ability to link multiple online social media accounts into one. As such, users are able to configure their specific preferences by filtering certain data. Thus, users are able to filter the data displayed by criteria including the following: 1) online social network, 2) members, 3) time frame, 4) location, 5) type of data and media.

This filtered display of online social networking data feed are presented to the user in a graphical manner as described herein, whereby each user's social network feed(s) are a distinct point on the social network map presented in a timeline. Multiple friends from multiple networks are displayed simultaneously on a single graphical interface.

Because the embodiment allows a user to configure their own social networking map and timeline, users are no longer required to track the activity of members across various social media sites. Rather, the activity is combined together in an easy to follow form.

An embodiment uses a computer, for example operating over a network. Embodiments may more generally connect to an array of server computers, respectively for multiple different social networks. Server computer 100 can host for example a first social network site, and server computer 110 hosts the second social network site. This embodiment shows different network computers hosting the different social network sites, but more generally this can be on one or more computers than shown. For example, the network/server computer 100 can host the Facebook site, while the server computer 110 can host the Twitter site. Any social network can be hosted in this way, where social network is more generally defined as any computer that has information about different users, and allows the different users to view information that others have presented. In the context of this application, social network sites include Facebook, twitter, Google plus, Flickr, Vimeo, YouTube, Instagram, and Picasa as shown, as well as any other social network site that tracks social relations among people and/or provides content to people based on their selections.

More generally in FIG. 1, there can be any number of networks connected together, all of which serve their content to one or more client computers 120, e.g. a desktop computer, as well as to a mobile device 130. Of course, the mobile device can receive this wirelessly.

The client computer, such as 120, uses a user's personal information to combine together and show the user the combined timeline site. This combination can be carried out on the computer 120, for example using an app that is running on the computer 120. Alternatively, the computer 130 can receive information from multiple sources as shown as 101, and aggregate this information to provide the information as the timeline.

The timeline that is displayed on the computers 120 and 130 as 198/199 have multiple different parts. The timeline allows the user to view, over time, the feeds from different users that have been provided as a function of time. The user can view feeds for themselves, and for their friends/connections in the social network. The timeline itself is controlled via a timeline controller 205 which has a slider 206 that can be moved across time to show information for different timelines. This can view for example what has been posted in the past, in the present, bringing by bringing the timeline to present, and can also view the future. The future view will only have scheduled events, since there are no feeds for the future.

In operation, the user sets up the timeline at any given time, by using a friend navigation selector 210. The friend navigation selector has pictures such as 211 showing each of the user's connections for friends on the social network. The user can select one of the friends such as 212, and drag that friend to the timeline. This puts the feeds from 212, such as the feed 213, into the user's timeline for the user to view. This feed that includes the things that the user has done, such as a twitter feed 214 from that selected user.

The sites navigation 220 allows the user to decide which of multiple different social networks information are to be displayed in the timeline. Again, this can be carried out by selecting an icon such as 221, and dragging that sites navigation into the timeline to obtain information from the site represented by that icon on the timeline. However, the information from that icon will only be information from the selected users.

Once the user is added to the timeline, their view appears in the selected friends list 215. The user can edit their friends by removing friends from the selected friends list 215. However, this 215 shows all friends that are currently visible in the timeline. The timeline slider itself 205 includes a start time portion 204 and the end time portion 206. The end time can be set to present in one embodiment. The distance between the two sliders 204, 205 sets the amount of time that is shown on the timeline. This can be expanded as more information is available (e.g., on larger screens of larger clients) is able to display the data. For example this allows selecting less information to display on the timeline when less information or when less area, is available.

The information can also be color-coded, for example different groups can have different colors.

One problem, noted above, is that the information from different sites may be the same information which is provided multiple times. One advantage of the present system is that when the same social network information, referred to herein as "posts", is provided multiple times, it is typically shown in the same spot since it was provided on those sites at the same time. More generally, the "post" can be any kind of social network information. For example, the duplicate post 239 may be duplicative of the post 266. Since these are shown at the same time, it is easy for the user to notice that these posts are duplicate.

The timeline itself shows on the main timeline portion 230, with a top portion and a bottom portion, where the user can select what goes into the top portion and what goes into the bottom portion.

Different areas on the timeline present different information that the user can view. For example, the closest portions to the timeline areas 231 and 232 show videos. As an example, this can show different YouTube videos such as 233 that were posted by either selected friends, e.g., on the selected social network, or selected items, for example items that the user has indicated that they "like".

In addition to the different YouTube videos at different times, text information 233, 234 is also shown. Note that the area 233 for example includes twitter feeds such as 234, links to videos such as 235, as well as daily information such as 236.

Short feeds such as twitter feeds 234 can be displayed right on the area. Other feeds such as 237 may have a shortened area that is displayed, but the user needs to roll over those feeds to obtain more information. The area 242, 243 shows the user's wall on the different social networks. The wall can include, for example, posts of the selected friends. As one example, the wall can include a post such as 238 from a friend and another post 239 from a different friend. The user's photos that have been uploaded 244, 245 are shown, and again this enables the users to see the photos that have been uploaded.

In order to preserve screen size, each of the boxes that are shown on the timeline may be limited in size. Again short feeds such as 237 can be abbreviated, and the user rolls over the feeds to get more information about the feeds. Feeds that are already limited in size, such as twitter 234, need not be abbreviated.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example while the above describes only certain social networks being aggregated together, it should be understood that there are many more kinds of applications that can be combined in this way. This can be used, for example, with other sites and specifically other social network sites.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system, comprising:

A computer having a network connection that is connected to receive information from a plurality of different social network sites, including at least a first social network site and a second social network site different than the first social network site, said computer operating based on programming in the computer, said computer having a processor programmed to and operating to combine said information into a single view that is displayed by the computer,
where processor creates said single view as to a timeline which extends along a first axis,
and said processor operates to determine a time associated with when each of a plurality of posts from each of said plurality of social network sites were posted, and arranging said posts from said each of the plurality of social network sites on the timeline, where a position of each post in the timeline along the first axis is set by the time when the post was posted, and where the processor arranges the different posts occupying overlapping times on the timeline are along a second axis, orthogonal to the first axis, and where the processor arranges the posts on the second axis according to a category of the posts, where each category of post comprises a post by a social network user of a specified type, wherein said categories of the posts include video information items occupying a first extent of the second axis, and not appearing outside of said first extent of the second axis, text information items occupying a second extent of the second axis different than the first extent, and not appearing outside of the second extent of the second axis, said text information items comprising textual posts made by users on the social networks, and social network wall information items occupying a third extent of the second axis different than the first and second extents, and not appearing outside the third extent of the second axis, said wall information items comprising posts made on walls of the social network sites by the users; and wherein said posts include the same post as posted on two different social network site, posted at two different locations on the second axis.

2. The computer system as in claim 1 wherein said processor operates to display different information items that were created at the same time as displayed at a same location in the timeline along the first axis, but at a different location along the second axis.

3. The computer system as in claim 2, wherein the timeline has a time axis that extends horizontally, and puts said different information items at the same location horizontally, and spaced from one another vertically.

4. The computer system as in claim 1, further comprising a timeline slider that controls selection different areas of the timeline to view, and where only a portion of the timeline is viewed at a first time based on a selection of said timeline slider.

5. The computer system as in claim 4, wherein the slider includes a start time and an end time for an area being viewed, and wherein the area is expanded or contracted based on setting the start time and end time set by the slider.

6. The computer system as in claim 1, wherein the single view includes a friend selector, enabling selecting different ones of multiple friends of the user, to display information items on the timeline and where friends who are not selected are not shown on the timeline.

7. The computer system as in claim 1, wherein the single view includes a social network selector, which shows information indicative of which of multiple different social network sites are displayed on the timeline, and enabling selecting information items from the different ones of the social network to display on the timeline.

8. The computer system as in claim 1, wherein the information items are displayed in boxes which show a content of the information items, and where a size of a box is limited by the processor to a certain size, and the processor truncates content of an information item based on the size of the box, and indicates in the box that more content is available.

9. The computer system as in claim 8, wherein further information from the information item that was truncated is obtained by rolling over an information item.

10. The computer system as in claim 6, wherein said friend selector comprises an area with photos of multiple friends in the first area, and allows the user to drag a photo of one of said friends to said timeline, in order to include posts from the friend who is dragged in the timeline, and where friends who are not dragged into the timelines posts do not appear in the timeline.

11. A computer system that receives information from multiple different social networks, aggregates said information from said multiple social networks, and displays said information from said multiple different social networks together on a timeline, where the timeline is arranged in a two-dimensional grid, with a horizontal axis representing a time at which the post was created, and a vertical axis denoting different kinds of items;
where said information includes all of video, text, wall posts, and photos at different areas in the vertical axis, where the vertical axis extends along a vertical axis, and a first extent of the vertical axis has video information items, and where the video information items do not appear outside of the first extent of the vertical axis, and a second extent of the vertical axis has text posts, and where the text posts do not extend outside the second extent of the vertical axis, and a third extent of the vertical axis includes wall posts, and said wall posts not appearing outside the third extent of the vertical axis
and where a user interface showing the timeline also includes an area with photos of multiple friends, and controls the user dragging a photo of one of said friends to said timeline, in order to include posts from the friend who is dragged into the timeline, and where friends who are not dragged into the timeline posts do not appear in the timeline; and
where the user interface also selects which of multiple different social network type sites provide content to the timeline, and where said posts include the same post as posted on two different social network site, posted at two different locations on the vertical axis.

12. The computer system as in claim 11 wherein said processor operates to display different information items of a same type that were created at the same time as displayed at a same location in the timeline along the horizontal axis, but at a different location in the vertical axis, within a same extent on the vertical axis.

13. The computer system as in claim 11, further comprising a timeline slider that allows a user to select different areas of the timeline to view, and where only a portion of the timeline is viewed at a first time based on selection by the slider.

14. The computer system as in claim 11, wherein the information items are displayed in boxes which show a content of the information items, and a where a size of a box is limited, and the computer truncates content of an information item based on the size of the box, and indicates in the box that more content is available.

15. The computer system as in claim 14, wherein further information from the information item that was truncated is obtained by rolling over an information item.

16. A method comprising:
in a computer system, receiving information from a plurality of different social network sites over an internet connection, including at least a first social network site and a second social network site different than the first social network site
combining said information into a single view that is displayed on the computer system, where said single view is arranged according to a timeline, which shows multiple information items from the multiple different social network sites arranged on the timeline showing the single view, said timeline showing the information from each of the multiple different social network sites as a function of a time at which the information items were created, where said timeline extends along a first axis, by determining a time on which each of a plurality of posts from each of said plurality of social network sites are posted, and arranging said posts from said each of the plurality of social network sites on the timeline where a position of each post in the timeline along the first axis is set by the time when the post was posted, arranging different posts occupying overlapping times on the timeline along a second axis, orthogonal to the first axis, and arranging the posts on the second axis according to a category of the posts, and where each category of post comprises a post by a social network user of a specified type, wherein said categories of the posts include video information items occupying a first extent of the second axis, and not appearing outside of said first extent of the second axis, text information items occupying a second extent of the second axis different than the first extent, and not appearing outside of the second extent of the second axis, said text information items comprising textual posts made by users on the social networks, and social network wall information items occupying a third extent of the second axis different than the first and second extents, and not appearing outside the third extent of the second axis, said wall information items comprising posts made on walls of the social network sites by the users; and wherein said posts include the same post as posted on two different social network site, posted at two different locations on the second axis.

\* \* \* \* \*